Sept. 26, 1967  J. H. KARDOL  3,343,617
TARE DEVICE FOR WEIGHING SCALES
Filed May 10, 1965
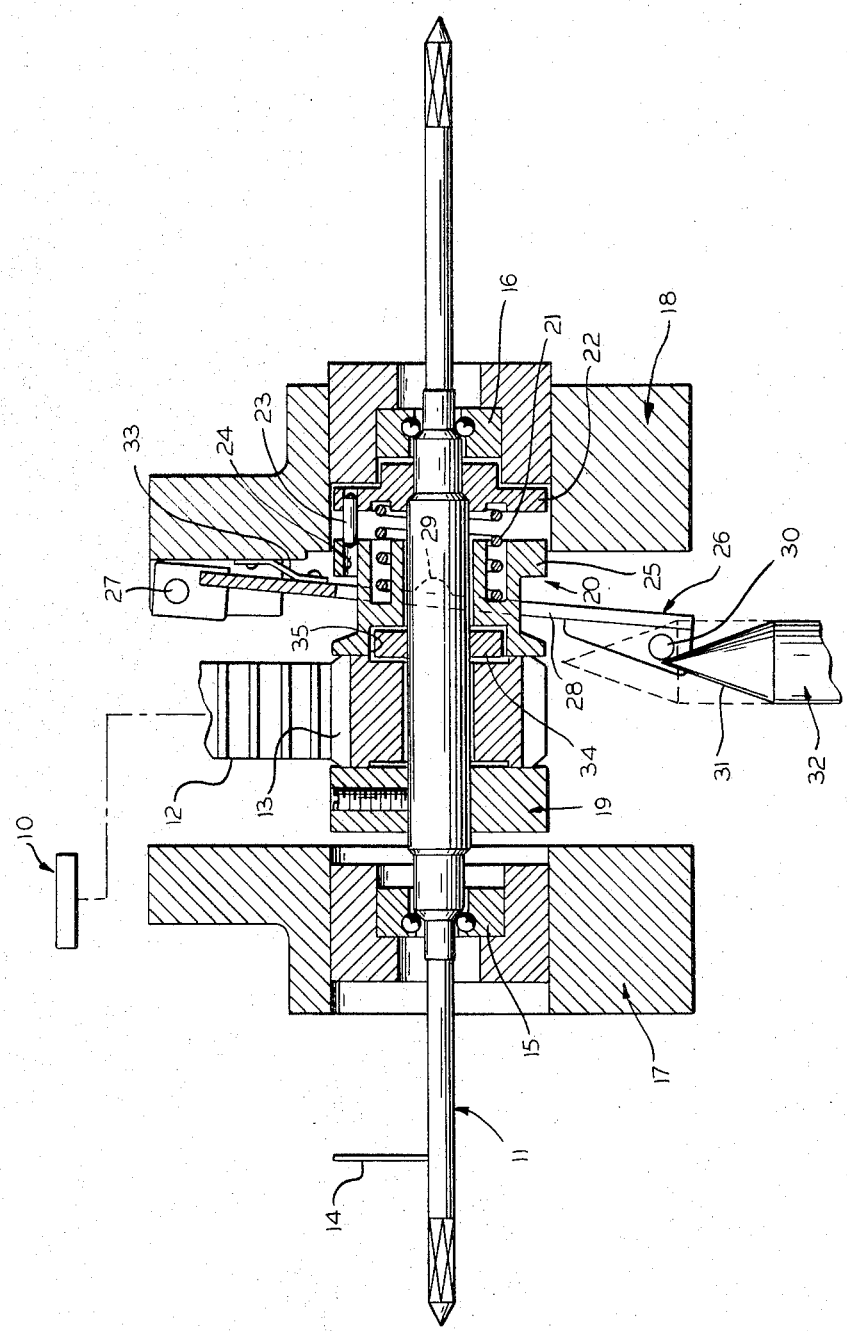
INVENTOR
JACOBUS HENDRIK KARDOL
BY
Margell, Johnston, Cook & Root
ATTORNEYS

United States Patent Office 3,343,617
Patented Sept. 26, 1967

3,343,617
TARE DEVICE FOR WEIGHING SCALES
Jacobus Hendrik Kardol, Schiedam, Netherlands, assignor to Maatschappij van Berkel's Patent N.V., Rotterdam, Netherlands, a company of the Netherlands
Filed May 10, 1965, Ser. No. 454,352
Claims priority, application Great Britain, May 15, 1964, 20,256/64
5 Claims. (Cl. 177—165)

ABSTRACT OF THE DISCLOSURE

Weighing mechanism having a clutch between the weighing platter and indicator for selectively connecting and disconnecting same and adjustably tare loading before normal weighing operations.

---

This invention relates in general to a weighing apparatus, and more particularly to a weighing apparatus having a tare clutch arranged between the weighing mechanism and the indicator, and still more particularly to a tare clutch that is closed or engaged between weighing operations and under torsional stress with the indicator at zero, and is actuatable to obtain a zero indication on the indicator when preloading the weighing mechanism with a tare weight.

Heretofore, in weighing apparatuses, when preloading the weighing mechanism, the tare weight is applied to the apparatus, the clutch is opened, and then the indicator is returned to the zero position. Thereafter the clutch is closed whereupon the apparatus is ready for indicating net weight. This method of tare loading is slow and therefore undesirable where it is intended that weighing operations must follow one another in quick succession. Moreover, if the weighing mechanism is not to be influenced by the actuation of the clutch, the latter must be constructed with a high degree of precision.

The tare clutch in the weighing apparatus of the present invention includes a clutch component that is spring biased to closed or engaged position, and control means adapted to press against the clutch element to open the clutch or disengage the clutch, wherein the arrangement is such that the control means on the return will move out of contact with the clutch element before the clutch closes or engages. The clutch components are preferably frictionally interengageable to transmit the drive to the indicator. Further, damping means such as a fluid cylinder is associated with the movable clutch element to retard the return movement and thereby facilitate movement of the control means out of contact with the element.

With the present invention, the method of tare loading may be simplified by releasing or opening the clutch before the tare weight is applied to the weighing mechanism, and thereafter closing or engaging the clutch when component from the control means during closing or the tare loading is complete. Thus, freeing of the clutch engaging of the clutch insures release of any deformations in the operating parts of the weighing mechanism arising from the stresses set up between weighing operations, and thereby enables actuation of the clutch in accordance with the simplified tare loading method without danger of such deformations or vibrations affecting the accuracy of the net indication.

It is therefore an object of the present invention to provide a new and improved tare clutching arrangement for a weighing apparatus.

Another object of the present invention resides in the provision of a tare clutch for a weighing apparatus that is operable without influencing the weighing mechanism.

Still another object of this invention is in the provision of a tare clutch that enables quick and easy preloading of the weighing mechanism without affecting the accuracy of the net indication.

Another object of this invention is in the provision of a simplified form of tare clutch for a weighing mechanism which is readily and quickly actuatable without influencing the weighing mechanism.

Other objects, features and advantages of the invention will be apparent from the following detailed disclosure, taken in conjunction with the accompanying sheet of drawing, wherein like reference numerals refer to like parts, in which:

The single figure is an axial sectional view of the tare clutch according to the present invention and showing it in engaged or closed position, with some parts shown diagrammatically and other parts omitted for purposes of clarity.

Referring now to the drawing, a weighing platter, generally indicated by the numeral 10, operates through a weighing mechanism, a horizontal shaft 11, through a rack 12 and a pinion 13, wherein the horizontal shaft carries a pointer 14 that moves over a scale to indicate the weight of the load. The weighing mechanism may be of the usual pendulum type.

The shaft 11 is rotatably supported in bearings 15 and 16 that are respectively mounted in a pair of spaced frames 17 and 18, whereby the pinion 13 is arranged on the shaft between the frames, and mounted on the shaft for free rotation thereon and for axial movement therealong.

A friction clutch is arranged between the frames 17 and 18 and includes a pair of spaced annular driving elements or jaws 19 and 20 mounted on each side of the pinion 13. The driving element 19 is in the form of a collar and is fixed to the shaft for rotation therewith and against axial movement therealong, while the driving element 20 is rotatable with the shaft but slidable therealong toward and away from the pinion 13. A coil spring 21 is arranged about the shaft 11 and bottomed at one end within an annular groove formed in the movable clutch element 20, and at the other end in a groove formed in a collar 22 fixed to the shaft for rotation therewith and against axial movement. The clutch element or slide jaw 20 is coupled to the collar 22 by a series of circumferentially spaced and arranged pins 23 that are fixed to the collar and that slidably engage in mating holes 24 formed in a flange 25 on the clutch element 20.

In order to control the operation of the clutch, and especially the movable clutch element 20, a yoke or inverted, U-shaped plate 26 is provided that is hinged at 27 to the frame 18, and which includes a pair of arms 28 saddling the clutch element 20. A projection 29 is provided on each of the arms 28 for engagement with the flange 25 to act thereagainst when urging the clutch element 20 into release position. The projections are slightly spaced from the flange when the clutch element 20 is in the engaged position as shown in the drawing. A crossrod 30 extends between the ends of the arms 28 and is enagageable by a conical end 31 of a reciprocal control rod 32. Upon reciprocation of the control rod 32, the conical end 31 cams the crossrod 30 to drive the clutch element 20 into release position relative to the pinion 13. A leaf spring 33 is mounted on the frame 18 and continually urges the yoke 26 toward the pinion gear 13.

In order to retard the movement of the sliding jaw or clutch element 20 when it is moving toward the pinion gear 13, a piston 34 fixed on the shaft 11 coacts with a cylinder 35 formed in the clutch element 20 to slow and dampen the movement of the clutch element into engaged position. The piston 34 is annular in shape as is the cylinder or opening into which it is received on the clutch element 20.

In operation, where it is desirous of employing the present invention to weigh a series of containers of approximately the same tare weight, each weighing operation is as follows. The conical head on the control rod 32 is moved to the position shown in dotted lines to move the yoke 28 toward the frame 18, thereby causing the projections 29 on the yoke to engage and slide the clutch element 20 toward the collar 22 against the action of the spring 21, and place the clutch in open or released position. In this position, the piston 34 is at the mouth of the cylinder 35 which is filled with air. A container is then placed on the load platter 10, wherein the weighing mechanism automatically adjusts and drives the pinion 13, which is free to rotate on the shaft with the clutch disengaged, while the pointer remains at zero, being retained there by virtue of the clutch control means, which also maintain in the relative operating parts, any deformation or errors previously created therein by the weighing mechanism. The control rod 32 is returned to the solid line position to permit return movement of the yoke 28 and the clutching element 20 to thereby lock the pinion 13 to the shaft 11 between the clutch elements 19 and 20. In the return movement, and before engagement of the clutch, the piston 34 of the damping device enters the cylinder 35, wherein the air cushion therein retards the axial movement of the clutching element 20 while the movement of the yoke 28 is in the position shown in solid lines, whereby the projections 29 necessarily move out of contact with the clutching element 20 to leave the shaft 11 and the pointer 14 momentarily free of any restraint by the control rod 32, and thereby prevent the entering into the weighing mechanism of any deviations which might affect the weighing mechanism or engagement of the clutch. With the clutch in engaged or closed position, the container is then filled and the pointer 14 indicates the true net weight. Upon removal of the filled container, the weighing operation is then repeated with the next container.

For accuracy in the weighing operation, it is preferable that the zero abutment on the scale be located at the outer end of the pointer, possible deformation due to the force against the abutment having no effect on the accuracy. In order to prevent the pointer from striking the abutment with too great a force, a major portion of the smallest applicable tare weight may be counterbalanced so that when the apparatus is inoperative, the pointer does not press with the full tare load against the abutment, but rather presses with only a small load a value which depends on the spread of the tare weights.

It should be further appreciated that the clutch of the present invention is applicable to weighing apparatus wherein the pointer is set to zero position by power means (electrical or mechanical). Further, it should be appreciated that the pinion may constitute the clutch component actuatable by the control means which thus restrains the pinion and weighing mechanism while the pointer remains freely rotatable.

It will be understood that modifications and variations may be effected without departing from the scope of the novel concepts of the present invention, but it is understood that this application is to be limited only by the scope of the appended claims.

The invention is hereby claimed as follows:

1. A weighing apparatus comprising a weighing mechanism, an indicator shaft and a tare clutch between said weighing mechanism and indicator shaft for adjustably placing tare into said mechanism before normal weighing operations, said tare clutch including a driving member connected to said weighing mechanism and freely rotatable on said shaft when the clutch is in disengaged position and a driven member coupled to said shaft for rotation therewith and movable into and out of engagement with said driving member, means operable for conditioning the clutch between engaging and disengaging conditions, and means for permitting free rotation of said driving member before engagement with said driven member but subsequent to operation of said conditioning means to cause engagement of the clutch to allow the settling of oscillations in the weighing mechanism normally created between weighing operations to minimize incorrect weight readings.

2. A weighing apparatus comprising a weighing mechanism, an indicator shaft and a tare clutch between said weighing mechanism and indicator shaft for adjustably placing tare into said mechanism before normal weighing operations, said tare clutch including a driving member connected to said weighing mechanism and freely rotatable on said shaft when the clutch is in disengaged position and a driven member coupled to said shaft for rotation therewith and movable into and out of engagement with said driving member, control means movable between first and second positions to condition the clutch for engagement or disengagement, and means for retarding the engagement of the clutch after the control means is moved to the position for clutch engagement to permit the driving and the driven members to freely adjust themselves just prior to engagement.

3. A weighing apparatus comprising a weighing mechanism, an indicator shaft and a tare clutch between said weighing mechanism and indicator shaft for adjustably placing tare into said mechanism before normal weighing operations, said tare clutch including a driving member connected to said weighing mechanism and freely rotatable on said shaft when the clutch is in disengaged position and a driven member coupled to said shaft for rotation therewith and movable into and out of engagement with said driving member, control means movable between first and second positions to condition the clutch for engagement or disengagement, and means for retarding the engagement of the clutch after the control means is moved to the position for clutch engagement to permit the driving and the driven members to freely adjust themselves just prior to engagement, said retarding means including a piston on said shaft coacting with a cylinder on said driven member.

4. A weighing apparatus comprising a weighing mechanism, an indicator shaft, and a tare clutch between said weighing mechanism and indicator shaft for selectively connecting and disconnecting said shaft and mechanism and for adjustably placing tare into said mechanism before normal weighing operations, said tare clutch including a driving member freely rotatable on said shaft when the clutch is disengaged and being continually responsive to the weighing mechanism, a driven member slidable along the shaft and coupled thereto for rotation therewith, control means movable between first and second positions to move the driven member into and out of frictional engagement with said driving member, and means for retarding movement of said driven member into engagement with said driving member when the control means is moved to the position for causing engagement of said members to permit the driving and driven members to freely adjust just prior to engagement.

5. A weighing apparatus comprising a weighing mechanism, an indicator shaft, and a tare clutch between said weighing mechanism and indicator shaft for selectively connecting and disconnecting said shaft and mechanism and for adjustably placing tare into said mechanism before normal weighing operations, said tare clutch including a driving member freely rotatable on said shaft when the clutch is disengaged and being continually responsive to the weighing mechanism, a driven member slidable along the shaft and coupled thereto for rotation therewith, control means movable between first and second positions to move the driven member into and out of frictional engagement with said driving member, a spring for normally urging said driven member into engagement with said driving member, and means for retarding movement of said driven member into engagement with said driving member when the control means is moved to the position for causing engagement of said members to permit the driving and driven members to freely adjust just prior to engagement, said retarding means including a piston fixed on said shaft coacting with a cylinder on said driven member.

References Cited

UNITED STATES PATENTS

| | | | |
|---|---|---|---|
| 1,448,860 | 3/1923 | Pearson | 192—109 |
| 2,008,023 | 7/1935 | Krag | 192—66 |
| 2,085,345 | 6/1937 | Tuttle et al. | 177—165 |
| 3,206,977 | 9/1965 | Mayer | 177—155 X |

RICHARD B. WILKINSON, *Primary Examiner.*

G. H. MILLER, *Assistant Examiner.*

UNITED STATES PATENT OFFICE
CERTIFICATE OF CORRECTION

Patent No. 3,343,617                               September 26, 1967

Jacobus Hendrik Kardol

It is hereby certified that error appears in the above numbered patent requiring correction and that the said Letters Patent should read as corrected below.

Column 1, lines 57 and 58, for "component from the control means during closing or the tare loading is complete. Thus, freeing of the clutch" read -- the tare loading is complete. Thus, freeing of the clutch component from the control means during closing or --; column 2, line 62, for "enagageable" read -- engageable --.

Signed and sealed this 3rd day of December 1968.

(SEAL)

Attest:

Edward M. Fletcher, Jr.                                    EDWARD J. BRENNER

Attesting Officer                                              Commissioner of Patents